US010755291B1

(12) United States Patent
Sharma et al.

(10) Patent No.: US 10,755,291 B1
(45) Date of Patent: Aug. 25, 2020

(54) ARTIFICIAL INTELLIGENCE AUTOMATION OF MARKETING CAMPAIGNS

(71) Applicant: Isolation Network, Inc., Encino, CA (US)

(72) Inventors: Shantanu K Sharma, Del Mar, CA (US); Daniel Cownden, Victoria (CA); James Parks, Victoria (CA); Michael Lavender, Victoria (CA); Jia Wen Tian, Victoria (CA)

(*) Notice: Subject to any disclaimer, the term of this patent is extended or adjusted under 35 U.S.C. 154(b) by 0 days.

(21) Appl. No.: 16/664,258

(22) Filed: Oct. 25, 2019

(51) Int. Cl.
*G06Q 30/02* (2012.01)
*G06N 20/00* (2019.01)
*G06N 5/04* (2006.01)

(52) U.S. Cl.
CPC .......... *G06Q 30/0201* (2013.01); *G06N 5/04* (2013.01); *G06N 20/00* (2019.01); *G06Q 30/0204* (2013.01); *G06Q 30/0246* (2013.01); *G06Q 30/0247* (2013.01); *G06Q 30/0254* (2013.01); *G06Q 30/0276* (2013.01)

(58) Field of Classification Search
CPC .......................... G06Q 30/00; G06Q 30/0277
USPC ............................................. 705/14.1, 14.73
See application file for complete search history.

(56) References Cited

U.S. PATENT DOCUMENTS

| 5,848,396 | A | 12/1998 | Gerace | 705/7.33 |
| 5,974,396 | A | 10/1999 | Anderson et al. | 705/7.33 |
| 6,298,330 | B1 | 10/2001 | Gardenswartz et al. | 705/14.25 |
| 6,370,578 | B2 | 4/2002 | Revashetti et al. | 709/224 |
| 7,081,579 | B2 | 7/2006 | Alcalde et al. | 84/608 |

(Continued)

FOREIGN PATENT DOCUMENTS

WO  2000/002138  1/2000

OTHER PUBLICATIONS dev.linkfire.com/docs/build-your-first-integration, "Get Started With Linkfire API", Jan. 30, 2018 (2 years before printing date of Jan. 30, 2020 as indicated on p. 16), pp. 1-16, (Year: 2018).*

(Continued)

*Primary Examiner* — John Van Bramer
(74) *Attorney, Agent, or Firm* — Venable LLP

(57) ABSTRACT

A method and system receive consumer media consumption data and dynamically prioritize the allocation of marketing resources amongst a variety of media intellectual property (IP) assets and for a variety of media IP asset managers and owners to run automated targeted marketing campaigns. The system identifies patterns in consumer media consumption using a statistical model which detects media IP assets demonstrating a high likelihood of realizing an efficient marketing opportunity. The efficiency of a marketing opportunity is evaluated using a statistical model based on the identification of customers who are most likely to increase the frequency with which they stream the assets after being exposed to them via a marketing action in addition to the projected costs of reaching this audience. The system automatically constructs a marketing campaign. The campaign is presented to the asset manager/owner in a graphical user interface (GUI) which enables the option to purchase and execute the marketing actions. Conditional on the execution of the marketing actions, the system performs an analysis on the efficacy of the marketing actions.

3 Claims, 13 Drawing Sheets

(56) References Cited

U.S. PATENT DOCUMENTS

| | | | |
|---|---|---|---|
| 7,958,119 B2 | 6/2011 | Eggink et al. | 707/732 |
| 10,169,765 B2 | 1/2019 | Kline et al. | G06Q 30/02 |
| 2003/0154126 A1 | 8/2003 | Gehlot et al. | 705/14.53 |
| 2006/0074746 A1 | 4/2006 | Kline et al. | 705/14.1 |
| 2006/0074747 A1 | 4/2006 | Kline et al. | 705/14.48 |
| 2006/0074748 A1 | 4/2006 | Kline et al. | 705/14.48 |
| 2006/0074749 A1 | 4/2006 | Kline et al. | 705/14.48 |
| 2009/0006211 A1* | 1/2009 | Perry | G06O 30/0277 |
| | | | 705/14.66 |
| 2009/0248496 A1 | 10/2009 | Hueter et al. | 705/7.29 |
| 2013/0024273 A1 | 1/2013 | Stark et al. | 705/14.43 |
| 2014/0019256 A1* | 1/2014 | Argue | G06Q 30/0255 |
| | | | 705/14.65 |
| 2014/0180790 A1* | 6/2014 | Boal | G06Q 30/0211 |
| | | | 705/14.42 |
| 2015/0324839 A1* | 11/2015 | Shariff | G06Q 30/0211 |
| | | | 705/14.46 |

OTHER PUBLICATIONS

F. Cadini, Monte Carlo-based filtering for fatigue crack groth estimation, 2009, Probabilistic Engineering Mechanics, 24, pp. 367-373 (Year: 2009).*

Datta, Hannes & Knox, George & Bronnenberg, Bart. (2017). Changing Their Tune: How Consumers' Adoption of Online Streaming Affects Music Consumption and Discovery. Marketing Science. 37.10.1287/mksc.2017.1051.

* cited by examiner

| Opportunity Ranking | Media Asset | Marketing Action(s) |
|---|---|---|
| 1 | Maxx Cobbler's Smootherest | Promote Placement of Song on a Spotify Curated Playlist on the Artist's and Label's Own Social Media Channels |
| 2 | The Mile Benders' Rawff Times | YT Video Promotion |
| 3 | Maxx Cobbler's Smootherest | Advertise Curated Playlist Placement on Social Media (Instagram & FB) |

Fig. 7

| Sample Twitter Post | Sample FB Post | Sample IG Post |
|---|---|---|
| Check out Smootherest! Featured on Spotify's Lorem Playlist | Image/Video | Image/Video |
| | Check Out Smootherest! Featured on Spotify's Lorem Playlist | Check Out Smootherest! Featured on Spotify's Lorem Playlist |
| Budget: | Budget: | Budget: |
| Dates: | Dates: | Dates: |
| Execute | Execute | Execute |

Fig. 9

| Action: Twitter Post ||||
| --- | --- | --- | --- | --- |
| Date | Spotify Listeners Acquired (Cumulative) | Spotify Streams Driven by Action (Cumulative) | Apple Music Listeners Acquired (Cumulative) | Apple Music Streams Driven by Action(Cumulative) |
| 03/26/2018 | 232 | 245 | 77 | 80 |
| 04/26/2018 | 317 | 368 | 107 | 121 |
| 05/26/2018 | 345 | 423 | 118 | 140 |
| 06/26/2018 | 374 | 468 | 123 | 154 |
| 07/26/2018 | 389 | 524 | 129 | 172 |
| 08/26/2018 | 391 | 602 | 135 | 199 |
| 09/26/2018 | 412 | 647 | 143 | 213 |
| 10/26/2018 | 436 | 759 | 158 | 250 |

Fig. 10

ARTIFICIAL INTELLIGENCE AUTOMATION OF MARKETING CAMPAIGNS

BACKGROUND

1. Technical Field

The field generally relates to the automatic detection of marketing opportunities, and the generation and execution of marketing campaigns, for media assets in the on-demand streaming market. The system and method primarily operate in the space between the platforms where the media are consumed by the user and the platforms where users can be reached.

2. Discussion of Related Art

Prior to the dominance of streaming consumption, the marketing efforts of media intellectual property (IP) asset managers and owners were focused on recent releases to drive one-off sales of singles and albums in a short window following release date. Currently, however, recurring streaming events, not purchases, are the primary monetizable events for media IP asset owners. Thus, there remains a need for systems and methods for determining how to best allocate promotional resources across the entirety of a media IP asset owner's catalog with the aim of driving recurrent streaming, not one-off purchases.

SUMMARY

An embodiment of the instant disclosure herein relates to a marketing analytics pipeline that receives transaction-level trend reporting of media IP assets distributed on digital service providers (DSPs), the marketing analytics pipeline including: an opportunity detection analytics hub configured to monitor consumption profiles of the media IP assets and automatically detect growth and re-engagement opportunities as they occur; a marketing action analytics hub configured to receive the growth and re-engagement opportunities from the opportunity detection analytics hub and to identify high growth potential audiences using predictive models of engagement; a marketing platform configured to interact with the marketing action analytics hub and to create marketing campaigns based around the high growth potential audiences and suggest marketing actions to media IP asset managers and owners to deliver to the high growth potential audiences on appropriate marketing channels via targeted marketing campaigns; and a campaign attribution analytics hub configured to use data from a consumption database, the marketing platform, a customer data platform, and third-party advertising platforms to accurately attribute the effect of the marketing campaigns.

An embodiment of the instant disclosure herein relates to an opportunity detection analytics hub configured to: monitor consumption profiles of media IP assets and automatically detect growth and re-engagement opportunities in an online setting as soon as they occur, including: using transaction-level trend data reports from a consumption database to fit statistical models based on consumption patterns of an entirety of distributed media IP assets in an offline setting on a regular cadence.

An embodiment of the instant disclosure herein relates to a marketing action analytics hub configured to: receive growth and re-engagement opportunities from an opportunity detection analytics hub and to identify high growth potential audiences using predictive models of engagement, including: automatically receiving media assets classified as potential marketing opportunities from the opportunity detection analytics hub.

An embodiment of the instant disclosure herein relates to a marketing platform configured to: interact with a marketing action analytics hub and create marketing campaigns based around high growth potential audiences and suggest marketing actions to media IP asset managers and owners to advertise to audiences predicted to be strongly engaged with their media assets on appropriate marketing channels via targeted marketing campaigns, including: receiving the ranked list of media assets and corresponding recommended marketing actions and their advertising platform descriptions of audiences for the media assets in the ranked list as well as a ranked list of auxiliary media assets from the marketing action analytics hub.

An embodiment of the instant disclosure herein relates to a campaign attribution analytics hub configured to: use data from a consumption database, a marketing platform, a customer data platform, and third-party advertising platforms to accurately attribute the effect of a marketing campaign, including: collecting new campaign specific trend data after a marketing campaign has been launched from the consumption database as soon as it is processed and made available for analysis.

Embodiments contemplated herein include any and all of methods, apparatus, tangible computer-readable media and others, related to the description provided herein.

BRIEF DESCRIPTION OF THE DRAWINGS

Further objectives and advantages will become apparent from a consideration of the description, drawings, and examples.

FIG. 7 shows an example of a list of media assets ranked by anticipated return on investment (ROI) that may be presented to a media intellectual property (IP) asset manager according to some embodiments of the disclosure.

FIG. 9 shows an example page that enables a media IP asset manager to set a budget and dates for a marketing action according to some embodiments of the disclosure.

FIG. 10 shows an example campaign analytics page according to some embodiments of the disclosure.

DETAILED DESCRIPTION

Figure 1:
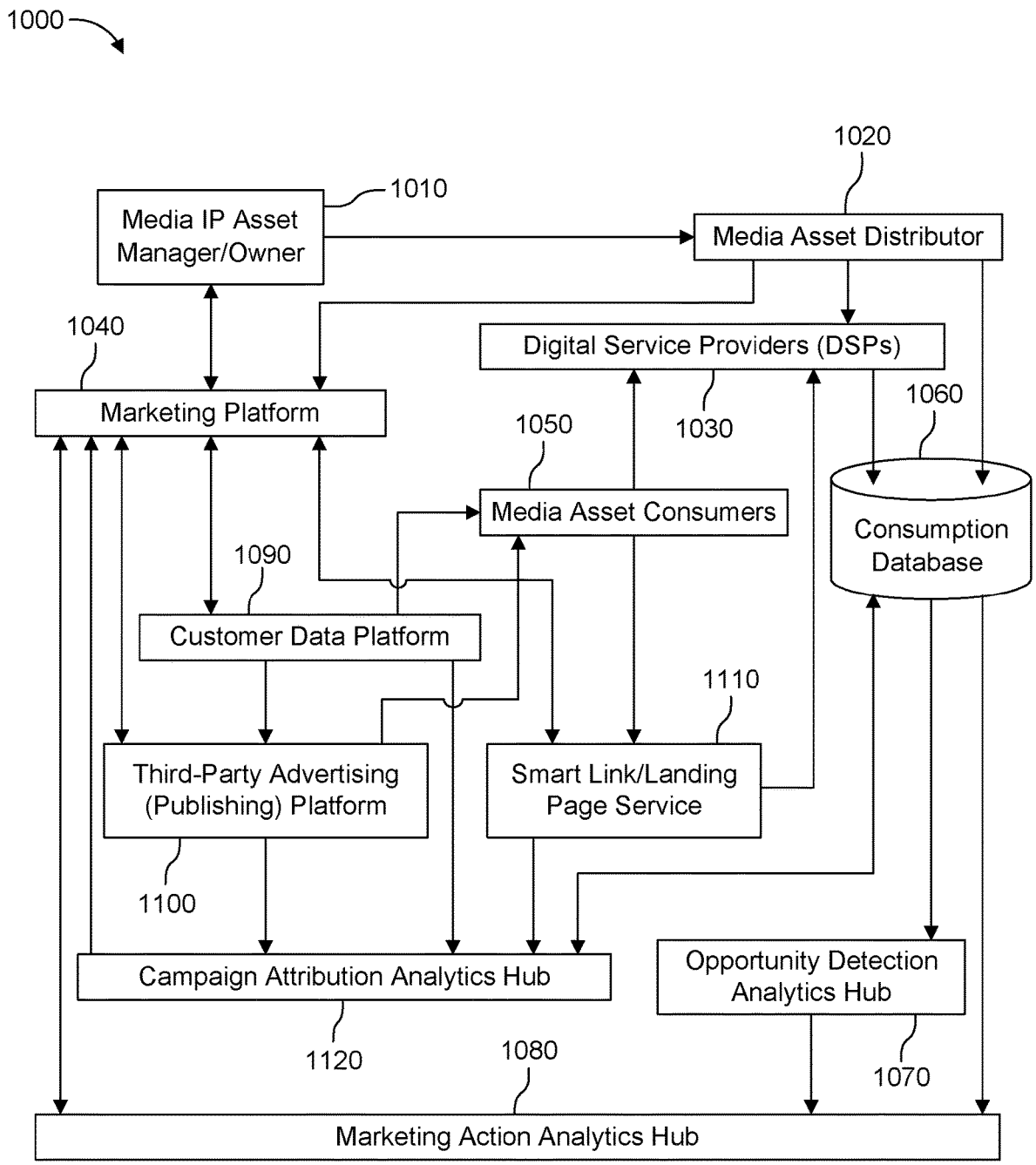
FIG. 1 shows a marketing analytics pipeline according to some embodiments of the disclosure.

Some embodiments of the current disclosure herein are discussed in detail below. In describing embodiments, specific terminology is employed for the sake of clarity. However, the disclosure herein is not intended to be limited to the specific terminology so selected. A person skilled in the relevant art will recognize that other equivalent components can be employed and other methods developed without departing from the broad concepts of the current disclosure herein. Any reference cited anywhere in this specification, including the Background and Detailed Description sections, is incorporated by reference in its entirety.

The recorded music industry has come to be dominated by on-demand streaming services (referred to as digital service providers (DSPs), e.g., Spotify, Apple Music). The dominant DSPs, as part of their contracts with the IP holders who license their content to these DSPs, provide detailed transaction-level reporting of all streaming events. This data provides unprecedented access and insight into how media asset consumers are engaging with specific IP, across multiple retail platforms.

DSPs charge consumers recurring subscription fees (and in some cases one-time fees or show advertisements) in exchange for access to large libraries of music, available on demand. This leads to fundamentally different patterns of music consumption than those found under previous purchase-based music consumption models, characterized by increased exploration and time spent engaging with music.

In contrast to DSP subscribers who pay fees independent of usage, DSPs predominantly pay media IP asset owners based on their IP's share of all streams on platform within a regional market over a given subscription billing period (typically monthly). Hence, a media IP asset owner's revenue is maximized when more media asset consumers stream their content more frequently than other content on a streaming platform. An additional consequence of this payment structure is that media assets generate revenues gradually over time as they are continually streamed by media asset consumers, not upfront in one-off purchases, as was characteristic of both physical and download media consumption.

Prior to the dominance of streaming consumption, the marketing efforts of media IP asset managers/owners were naturally focused on recent releases to drive one-off sales of singles/albums in the short window following release date. However, now that recurring streaming events, not purchases, are the primary monetizable events for media IP asset owners, increasing long term engagement for their entire catalog of media assets, regardless of release date, is now the focus. How to best allocate promotional resources across the entirety of a media IP asset owner's catalog with the aim of driving recurrent streaming, not one-off purchases, is a problem which some embodiments of the present disclosure addresses.

The systems and methods of the present disclosure include several parts, and enable prioritization of promotional activities over a broad catalog of media assets, by sizing the likely reception of the media for specific audiences and channels on the one hand, and the costs of reaching those audiences through various marketing channels on the other. This is made possible through the automated generation of concrete executable marketing actions paired with specific media assets, and their prospective evaluation, based on statistical models trained on retrospective analyses of similarly generated campaigns. That is, this method takes as a key input media streaming events and using these inputs generates a prioritized list of media assets, coupled with promotional actions for those assets.

The key data input, media streaming events, also differs from other conventional processes, specifically those pertaining to traditional retail/sales transactions. Consumers of subscription media streaming have zero marginal monetary costs for exploration, which leads to a greater diversity of products (in this case media IP assets) being consumed. Additionally, DSP client software actively supports the discovery of new media assets by consumers, both by providing radio stations, playlists and channels curated for passive discovery, and by providing artist and album browsing features which enable media asset consumers to actively engage with the media assets discovered on radio stations, playlists and channels, and related media assets (e.g. sound recordings by the same artist). For this reason, the systems and methods according to some embodiments of the present disclosure do not treat media streaming as homogeneous consumption events, but instead take full advantage of the details available, especially around streaming context, and the state of consumer engagement that can be inferred from these contextual details across multiple streaming events.

Marketing Analytics Pipeline

FIG. 1 is a schematic of a marketing analytics pipeline 1000 according to some embodiments of the present disclosure. As shown in FIG. 1, marketing analytics pipeline 1000 in this embodiment includes Media IP Asset Manager/Owner 1010, Media Asset Distributor 1020, Digital Service Providers (DSPs) 1030, Marketing Platform 1040, Media Asset Consumers 1050, Consumption Database 1060, Opportunity Detection Analytics Hub 1070, Marketing Action Analytics Hub 1080, Customer Data Platform 1090, Third-Party Advertising (Publishing) Platform 1100, Smart Link/Landing Page Service 1110, and Campaign Attribution Analytics Hub 1120. Each component is responsible for different and sometimes overlapping tasks, and each is discussed below. Some embodiments need not include all components, and need not include all of the tasks or the specific distribution of tasks as described herein.

Briefly, according to one aspect described herein, the marketing analytics pipeline 1000 receives transaction-level trend reporting of media IP assets distributed on DSPs 1030. The marketing analytics pipeline 1000 includes an opportunity detection analytics hub 1070 configured to monitor consumption profiles of the media IP assets and automatically detect growth and re-engagement opportunities as they occur. The marketing analytics pipeline 1000 includes a marketing action analytics hub 1080 configured to receive the growth and re-engagement opportunities from the opportunity detection analytics hub 1070 and to identify high growth potential audiences using predictive models of engagement. The marketing analytics pipeline 1000 includes a marketing platform 1040 configured to interact with the marketing action analytics hub 1080 and to create marketing campaigns based around the high growth potential audiences and suggest marketing actions to media IP asset managers and owners 1010 to deliver to the high growth potential audiences on appropriate marketing channels via targeted marketing campaigns. The marketing analytics pipeline 1000 includes a campaign attribution analytics hub 1120 configured to use data from a consumption database 1060, the marketing platform 1040, a customer data platform 1090, and third-party advertising platforms 1100 to accurately attribute the effect of the marketing campaigns.

Figure 2:
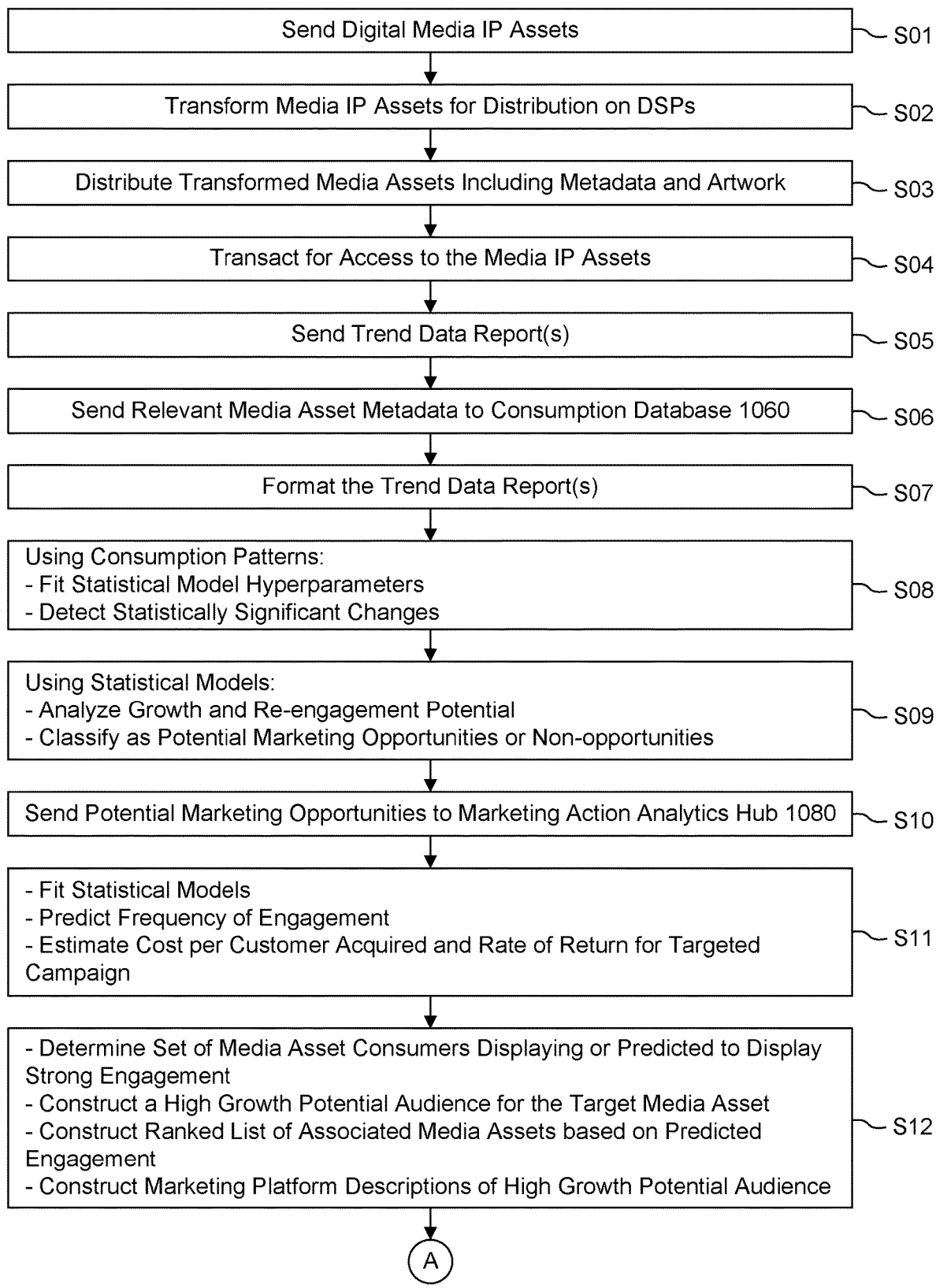
FIG. 2 is a flow diagram depicting a plurality of steps executed by the marketing analytics pipeline according to some embodiments of the disclosure.
Figure 2:
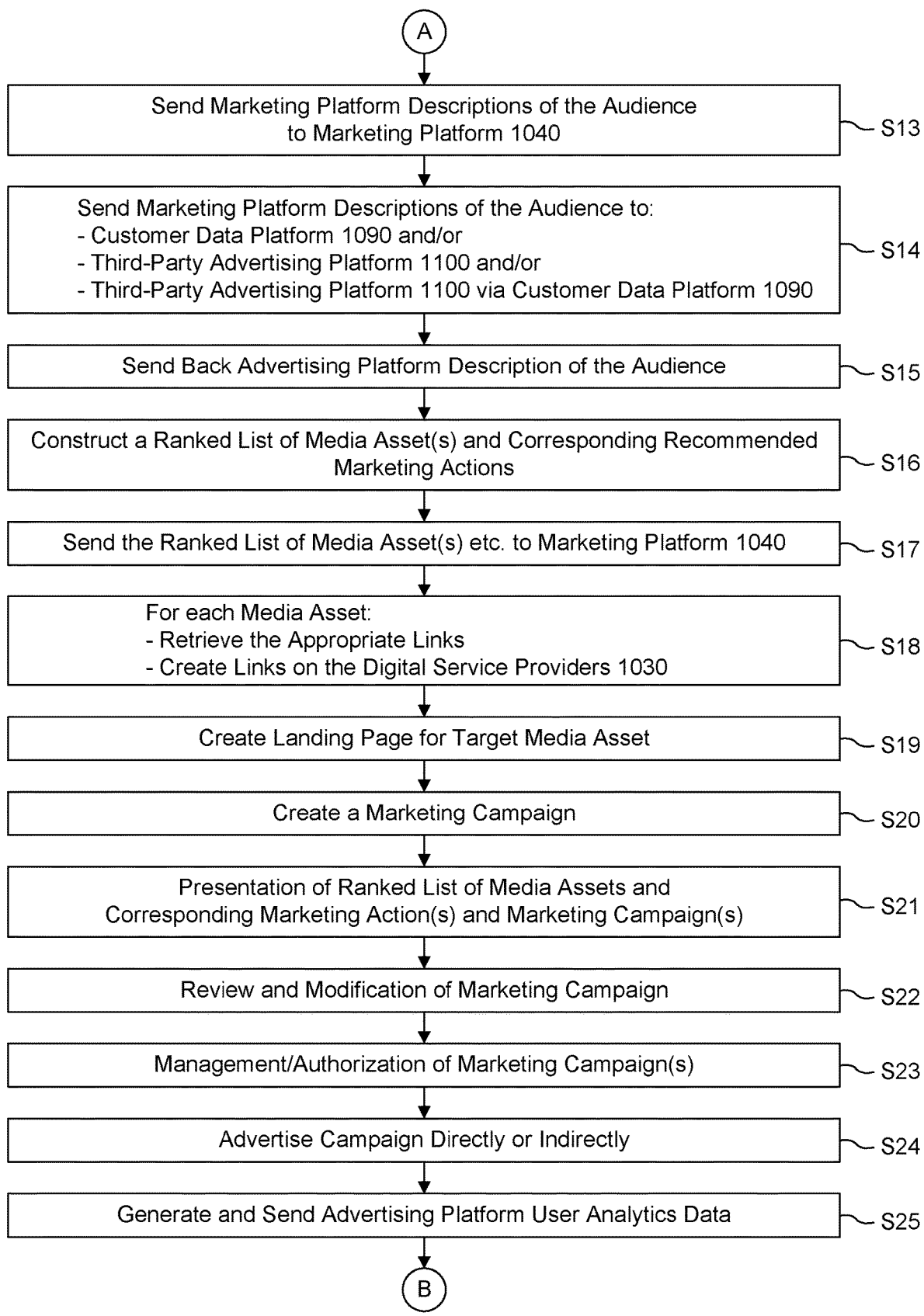
Figure 2:
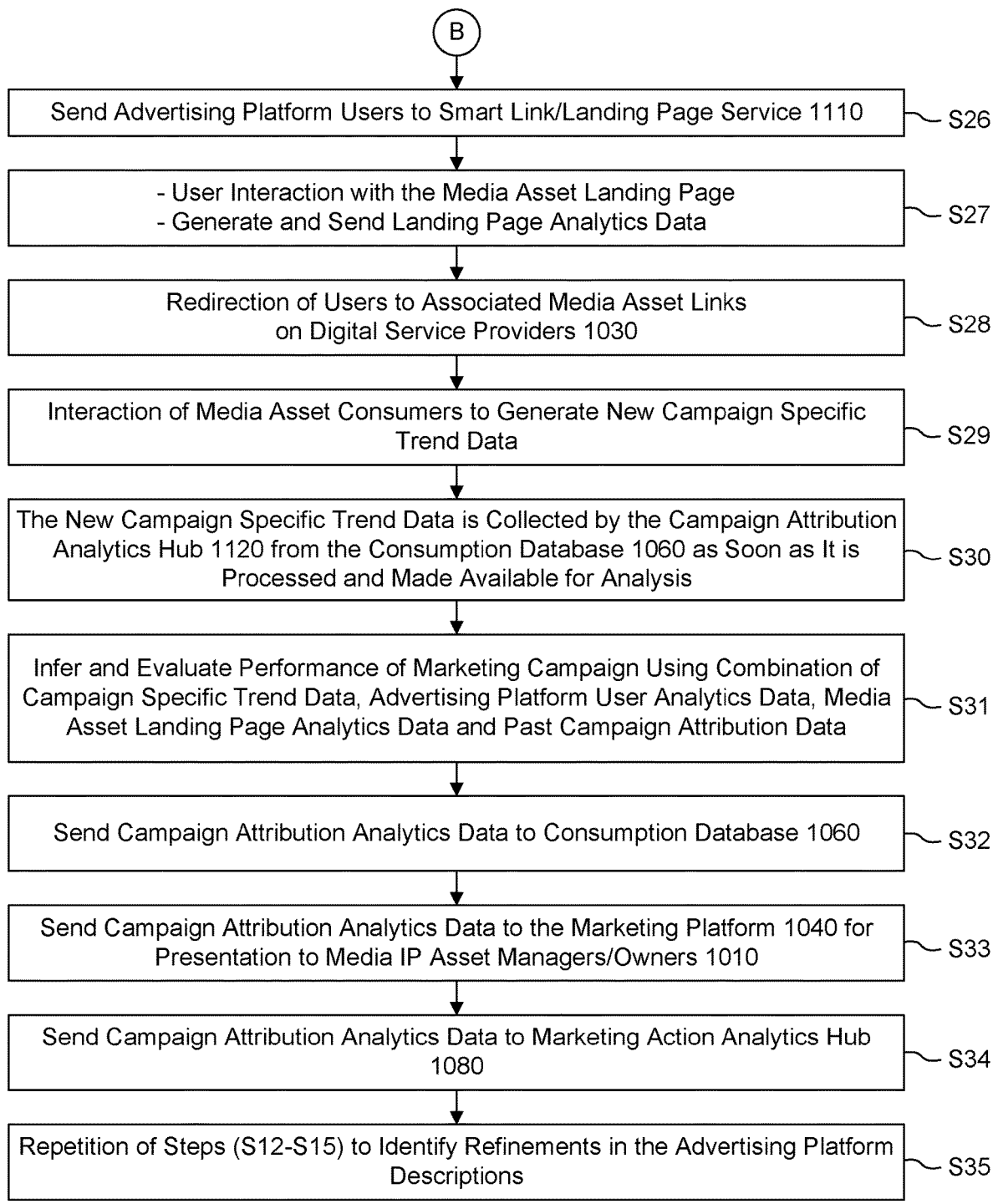

In more detail, FIG. 2 is a flow diagram depicting a plurality of steps executed by the marketing analytics pipeline according to some embodiments of the disclosure. The marketing analytics pipeline 1000 describes the process from the consumption of media assets on DSPs to the detection of marketing opportunities for media assets to the generation of target audiences for the media assets to the presentation of marketing actions to media assets managers to the delivery of advertisements to the audiences off of streaming platforms to the attribution of marketing actions in the consumption database from said marketing actions.

In step S01 of the marketing analytics pipeline 1000, media IP asset managers/owners 1010 send digital media IP assets along with their associated metadata (e.g., audio, video, artwork, etc.) to a digital media asset distributor 1020. In step S02, the media IP assets and their associated metadata are then transformed into appropriate formats for distribution on DSPs 1030. In a specific embodiment of this process, promotional advertisement material, e.g., album art, sample sound clips, etc., are also submitted along with the media IP assets by the media IP asset managers/owners 1010 to the media asset distributor 1020.

In step S03, the media asset distributor 1020 then sends the transformed media assets, metadata and artwork to DSPs 1030 (e.g., Apple Music, Pandora, Spotify, YouTube, etc.), and to a marketing platform 1040. In step S04, DSPs 1030 collect subscription or one-time fees or serve advertisements to consumers in exchange for access to the audio/visual media IP assets sent via a media asset distributor 1020 with the explicitly contracted permission of the owners of said media IP assets 1010. The interaction between the media asset consumers 1050 and the DSPs 1030 is documented and compiled in a transaction-level trend data report.

In step S05, the trend data report is sent from the DSPs 1030 to a consumption database 1060 where it is ingested and processed on a regular cadence typically lagging the actual consumption events by a few days. The media asset distributor 1020 sends the relevant media asset metadata to the consumption database 1060 in step S06. In step S07, the consumption database 1060 uses the media asset metadata to format the trend data reports so that consumption patterns across multiple DSPs 1030 can be analyzed together.

In step S08, an opportunity detection analytics hub 1070 uses the transaction-level trend data reports in the consumption database 1060 to fit statistical model hyperparameters based on the consumption patterns of the entirety of media assets in an offline setting on a regular cadence (e.g., weekly, monthly). The opportunity detection analytics hub 1070 also uses the transaction-level trend data reports in the consumption database 1060 to automatically detect statistically significant changes in the consumption patterns for the entirety of media assets in an online setting (i.e., as soon as the trend data report is processed by the consumption database 1060 and made available for analysis).

In step S09, the opportunity detection analytics hub 1070 uses statistical models to analyze the growth and re-engagement potential for the media assets exhibiting or predicted to exhibit significant changes in their consumption patterns and classifies them as potential marketing opportunities or non-opportunities. Media assets classified as non-opportunities do not proceed further in the marketing analytics pipeline 1000.

The opportunity detection analytics hub 1070 automatically sends those media assets classified as potential marketing opportunities to a marketing action analytics hub 1080 in step S10. In step S11, the marketing action analytics hub 1080 uses the transaction-level trend data reports and metadata as well as past marketing campaign results in the consumption database 1060 to fit statistical models based on the consumption behavior of all media asset consumers 1050 to predict the frequency of engagement of said consumers with the entirety of media assets should they become exposed by marketing actions, and to estimate the cost per customer acquired and the rate of return on customers acquired by a campaign targeted to those customers classified as highly likely to increase their frequency of engagement with a target media asset. The statistical models are fit in an offline setting on a regular cadence (e.g., weekly, monthly).

When the marketing action analytics hub 1080 receives a target media asset from the opportunity detection analytics hub 1070 it automatically uses the transaction-level trend data reports in the consumption database 1060 in step S12. The marketing action analytics hub 1080 may use the transaction-level trend data reports to determine the set of media asset consumers 1050 displaying or predicted to display strong engagement with the target media asset. The marketing action analytics hub 1080 may use the transaction-level trend data reports to construct a high growth potential audience for the target media asset based on statistical models and the media asset consumers displaying or predicted to display strong engagement.

The marketing action analytics hub 1080 may use the transaction-level trend data reports to construct a ranked list of auxiliary media assets based on the predicted engagement of the high growth potential audience in a specific embodiment of this process. Auxiliary media assets associated with the target media may be selected at the artist or media asset manager level. The marketing action analytics hub 1080 may use the transaction-level trend data reports to construct marketing platform descriptions of the high growth potential audience for the media asset based on supported advertising platforms.

In step S13, the marketing action analytics hub 1080 sends the marketing platform descriptions of the audience for the media asset to the marketing platform 1040. In step S14, the marketing platform 1040 then sends the marketing platform descriptions of the audience for the media asset to one or more of the following: a customer data platform 1090 to construct an advertising platform description of the audience for the media asset; a third-party advertising platform 1100 (e.g., Google Ads, Facebook, Instagram) to construct an advertising platform description of the audience for the media asset; or a customer data platform 1090 which transforms the description of the media asset before sending the transformed description to a third-party advertising platform 1100 to construct an advertising platform description of the audience for the media asset.

In step S15, the advertising platform description of the audience for the media asset is sent back to the marketing platform 1040 and on to the marketing action analytics hub 1080 from either a customer data platform 1090 or a third-party advertising platform 1100.

In step S16, for (possibly multiple) media assets owned by the media IP asset owner 1010, the marketing action analytics hub 1080 uses statistical models, each media asset's high growth potential audience and an advertising platform description of that audience to construct a ranked list of media assets and corresponding recommended marketing actions based on their potential cost and estimated return on investment. Media assets which do not generate corresponding marketing actions or advertising platform descriptions do not proceed further in the marketing analytics pipeline 1000.

In step S17, the marketing action analytics hub 1080 sends the ranked list of media assets and corresponding recommended marketing actions and their advertising platform descriptions of the audiences for the media assets in the list as well as a possible ranked list of auxiliary media assets to the marketing platform 1040.

In step S18, for each media asset in the ranked list of media assets and corresponding recommended marketing actions, the marketing platform 1040 uses application programming interfaces (APIs) of the DSPs 1030 and the associated metadata for the media asset to retrieve the appropriate links for the media asset on the DSPs 1030, and to create links on the DSPs 1030 that (in addition to the target media asset) also include the highly ranked auxiliary media assets from the ranked list of auxiliary media assets (e.g., playlist, radio station) in a specific embodiment of this process. These links are then retrieved from the DSPs 1030 by the marketing platform 1040.

In step S19, for each target media asset in the ranked list of media assets and corresponding recommended marketing actions, the marketing platform 1040 uses APIs of smart link/landing page services 1110 (e.g. Feature.fm, Linkfire) along with the associated metadata for the media asset and the appropriate links on DSPs 1030 to create a landing page for the target media asset.

In step S20, for each target media asset and corresponding marketing action in the ranked list, the marketing platform 1040 uses APIs of the third-party advertising platforms 1100 as well as their associated metadata, landing pages and advertising platform descriptions of the potential growth audience for the media asset to create a marketing campaign. In step S21, the ranked list of media assets and corresponding marketing actions and marketing campaigns is presented by the marketing platform 1040 to the media IP asset managers/owners 1010 in a graphical user interface (GUI) or through an alert notification. The marketing platform 1040 enables media IP asset managers/owners 1010 to review and modify the marketing campaign in step S22.

In step S23, the GUI in the marketing platform 1040 also enables media IP asset managers/owners 1010 to manage funds, set budgets and store promotional advertisement material for marketing campaigns. Media IP asset managers/owners 1010 are also presented with the option to authorize and execute marketing campaigns. If the media IP asset managers/owners 1010 do not execute the marketing campaign, then it does not proceed further in the marketing analytics pipeline 1000. Additionally, media IP asset managers/owners 1010 can also pre-authorize the execution of campaigns exceeding a pre-determined threshold of anticipated cost efficacy.

In step S24, the marketing platform 1040 executes the marketing campaign by either advertising the campaign to users on third-party advertising platforms 1100, or by advertising the campaign directly to users via a customer data platform 1090 in a specific embodiment of this process. In step S25, advertising platform users interact with the marketing campaign which generates advertising platform user analytics data that is sent either through a third-party advertising platform 1100 or customer data platform 1090 to a campaign attribution analytics hub 1120.

In step S26, the marketing campaign advertisement includes a call-to-action to consume the associated media asset on DSPs 1030 which sends the advertising platform users to the corresponding media asset landing page generated and hosted by the smart link/landing page service 1110. Advertising platform users interact with the media asset landing page which generates landing page analytics data that is sent to the campaign attribution analytics hub 1120 in step S27. In step S28, advertising platform users interact with the media asset landing page and are redirected to the associated media asset links on DSPs 1030. Advertising platform users that are not also media asset consumers 1050 of the appropriate DSP 1030 do not proceed further in the marketing analytics pipeline.

In step S29, media asset consumers 1050 interact with media asset links on the corresponding DSPs 1030 which generate new campaign specific trend data that is then processed by the consumption database 1060. The new campaign specific trend data is collected by the campaign attribution analytics hub 1120 from the consumption database 1060 as soon as it is processed and made available for analysis in step S30.

In step S31, the campaign attribution analytics hub 1120 combines the campaign specific trend data, advertising platform user analytics data, media asset landing page analytics data and past campaign attribution data to infer and subsequently evaluate the performance of the marketing campaign. The campaign performance evaluation generates campaign attribution analytics data for the marketing campaign. In a specific embodiment of this process the campaign attribution analytics hub 1120 evaluates the performance by attributing how many new consumers were acquired by the marketing campaign, their rate of engagement with the target assets, and the increased engagement rates of existing consumers of the media assets who were reached by the campaign.

In step S32, the campaign attribution analytics hub 1120 sends the campaign attribution analytics data to the consumption database 1060 to be used to evaluate possible future marketing campaigns. In step S33, the campaign attribution analytics hub 1120 also sends the campaign attribution analytics data to the marketing platform 1040 where the evaluation is presented to the media IP asset managers/owners 1010 in a GUI or through an alert notification.

In step S34, the marketing platform 1040 sends the campaign attribution analytics data to the marketing action analytics hub 1080. In step S35, the campaign attribution analytics data may be used by the marketing action analytics hub 1080 and marketing platform 1040 by repeating steps S12-S15 to inform any necessary refinements in the advertising platform descriptions of the potential growth audience for the media asset which conditional on any changes to the audience description updates the current marketing campaign in the marketing platform 1040.

Opportunity Detection Analytics Hub 1070

Briefly, according to one aspect described herein, the opportunity detection analytics hub 1070 is configured to monitor consumption profiles of media IP assets and automatically detect growth and re-engagement opportunities in an online setting as soon as they occur, including using transaction-level trend data reports from the consumption database 1060 to fit statistical models based on consumption patterns of an entirety of distributed media IP assets in an offline setting on a regular cadence.

Figure 3:
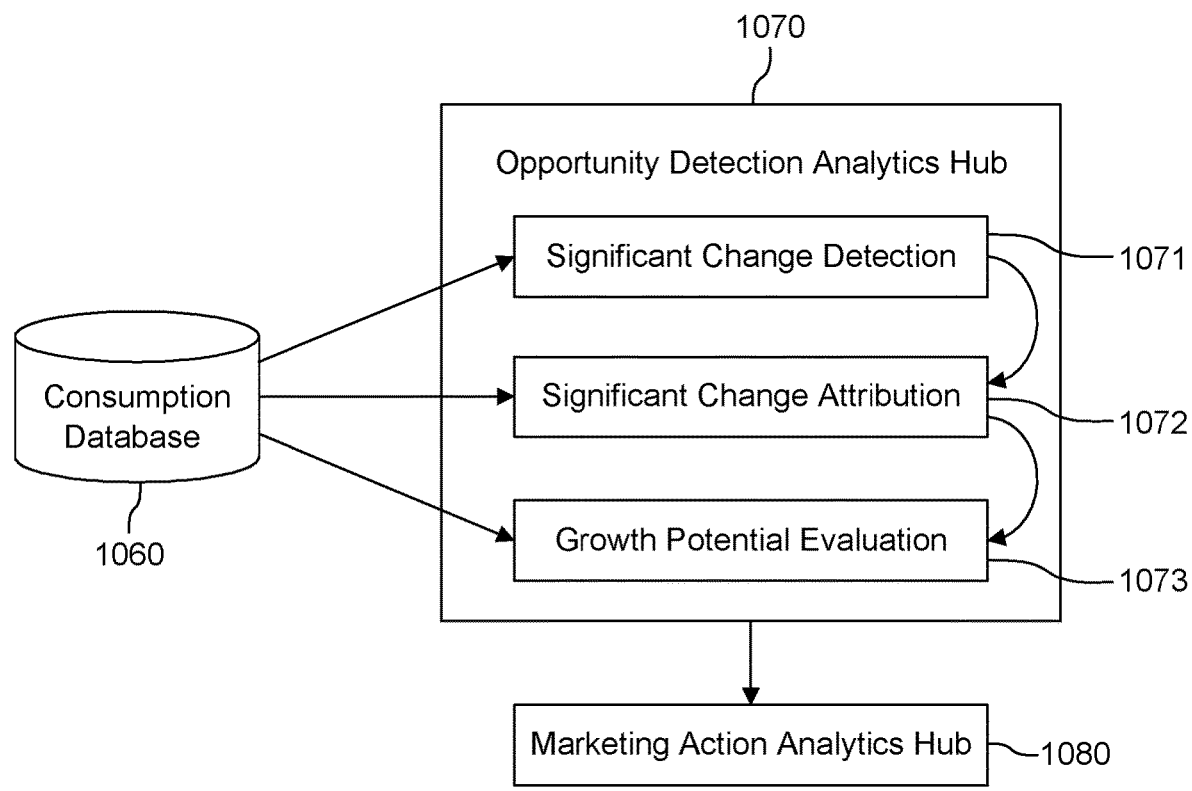
FIG. 3 is a schematic showing additional details of an opportunity detection analytics hub according to some embodiments of the disclosure.

In more detail, FIGS. 3-6 describe some embodiments of the marketing analytics pipeline and process illustrated in FIGS. 1 and 2. FIG. 3 is a schematic showing additional details of the opportunity detection analytics hub 1070 according to some embodiments of the disclosure. In a specific embodiment of the process, the opportunity detection analytics hub 1070 uses statistical models to detect statistically significant shifts in the streaming consumption patterns of a media asset by constantly scanning new consumption data from the consumption database 1060 as it becomes available (significant change detection 1071). Media assets experiencing significant changes in their streaming consumption patterns are then passed on to a sub-module (significant change attribution 1072) for further analysis.

The opportunity detection analytics hub 1070 uses a statistical model along with additional data from the consumption database 1060 to determine the proximal causes of change in streaming consumption (significant change attribution 1072). The opportunity detection analytics hub 1070 (growth potential evaluation 1073) uses a statistical model applied to additional data from the consumption database 1060 according to the proximal drivers of change identified by (significant change attribution 1072) to evaluate the potential marketing opportunity of the media asset. Media assets classified as opportunities are passed along to the marketing action analytics hub 1080.

In a specific embodiment of the system and process schematically illustrated in FIG. 3, significant change detection 1071 monitors media assets in the form of sound recordings, lyrics/album art videos, and/or music videos and scans for significant changes in their streaming consumption patterns (i.e. significant changes in their daily stream count time series). The total stream count is computed daily for all distributed DSPs for sound (e.g., Spotify, Apple Music, Pandora, Amazon, etc.) and video recordings (e.g., YouTube, Vevo, etc.).

Significant changes in consumption patterns are called regions of significant change and are detected according to a model of daily stream counts. In general, the model of daily stream counts is characterized by its ability to accurately and efficiently detect regions of significant change as soon as they occur. This is achieved through a model that is both trained and run online on each media asset individually across all DSPs and engagement contexts. The model learns the consumption patterns of media assets by accommodating for the strong day of week effect present in streaming media consumer behavior and adapting to the underlying distribution so that when statistically significant deviations from typical consumption patterns occur, they are detected as soon as the data is available. Additionally, the model is characterized by its ability to provide confidence intervals for the most probable future consumption patterns of media assets based on their past consumption patterns rather than simple point estimates. The model explicitly estimates the growth rate and it uses this estimate to identify regions of significant change. Since only the hyperparameters are trained on global consumption patterns, training on the consumption patterns of each individual media asset does not depend on global consumption patterns, which enables the model to be parallelized for efficient computation. This model detects both gradual and rapid changes in consumption.

In the embodiment described herein, the modeling of daily stream counts proceeds by modeling daily stream counts y as noisy measurements of a latent multivariate state vector z consisting of level −l, trend b, and periodic offset s components. The latent state propagates forward in time via a linear Markov process, i.e., $z_t = A_t z_{t-1} + \varepsilon_t \epsilon_t$, while its connection to new data is modeled as $y_t = B_t z_t + \eta_t$. The full posterior distribution of the state is propagated forward in time by employing a dynamic Bayesian network, which recursively updates the state distribution with each new data point as $p(z_t | y_{0:t}) \propto p(y_t | z_t) \int p(z_t | z_{t-1}) p(z_{t-1} | y_{0:t-1}) dz_{t-1}$. Future state distributions in the absence of new data are then predicted by computing $$p(z_{t+T} | y_{0:t}) = \int p(z_{t+T} | z_{t+T-1}) p(z_{t+T-1} | z_{t+T-2}) \ldots p(z_t | y_{0:t}) dz_{t+T-1} dz_{t+T-2} \ldots dz_t.$$

In this specific embodiment, rapid changes in consumption (changes occurring on the same time scale that the data is sampled) are detected by recursively calculating the probability that the current state distribution is equivalent to the predicted one based on previous data. Moreover, explicitly modeling the posterior distribution of the trend b enables the detection of gradual significant changes by recursively calculating the probability that b significantly deviates from zero.

Once a statistically significant change in the total stream count has been detected, significant change attribution 1072 is then used to determine the proximal cause(s) of the region of significant change.

Additional engagement metrics in the trend reporting are used to determine the proximal causes of a region of significant change. Daily stream counts are separated into their individual retailer daily stream counts as well as further separated into streaming context (where the trend data is available for a DSP). For a sound recording the streaming context is separated into two main categories: active streams (e.g. streams from active search or collection) and passive streams (e.g. streams from editorial or algorithmic playlists or radio). Additionally, passive streams are further separated into the specific playlists and radio stations constituting the overall passive streams. Significant change attribution 1072 uses these engagement metrics to inform a probabilistic model to attribute the on-platform causes of the region of significant change. For regions of significant change attributed to active streams, additional information (e.g., news articles, social media activity) may be required to attribute the off-platform activity causing the region of significant change.

Media assets exhibiting significant changes in their streaming consumption patterns are then sent to growth potential evaluation 1073 to be classified as either potential marketing opportunities or non-opportunities using a statistical model applied to additional engagement metrics in the trend reporting. Key engagement metrics used in this model include the passive to active conversion rate, the search conversion rate, and the engagement drop off rate. The passive to active conversion rate determines the proportion of media asset consumers in a given time window that streamed a sound recording in a passive context and then went on to stream again in an active context. The search conversion rate determines the proportion of media asset consumers in a given time window that streamed a sound recording for the first time from active search and then streamed actively again from their collection. The engagement drop off rate determines the rate at which engaged consumers stop engaging with the media asset.

The opportunity detection analytics hub 1070 passes the media assets classified as opportunities along to the marketing action analytics hub 1080.

Marketing Action Analytics Hub 1080

Briefly, according to one aspect described herein, the marketing action analytics hub 1080 is configured to receive growth and re-engagement opportunities from the opportunity detection analytics hub 1070 and to identify high growth potential audiences using predictive models of engagement, including automatically receiving media assets classified as potential marketing opportunities from the opportunity detection analytics hub 1070.

Figure 4:
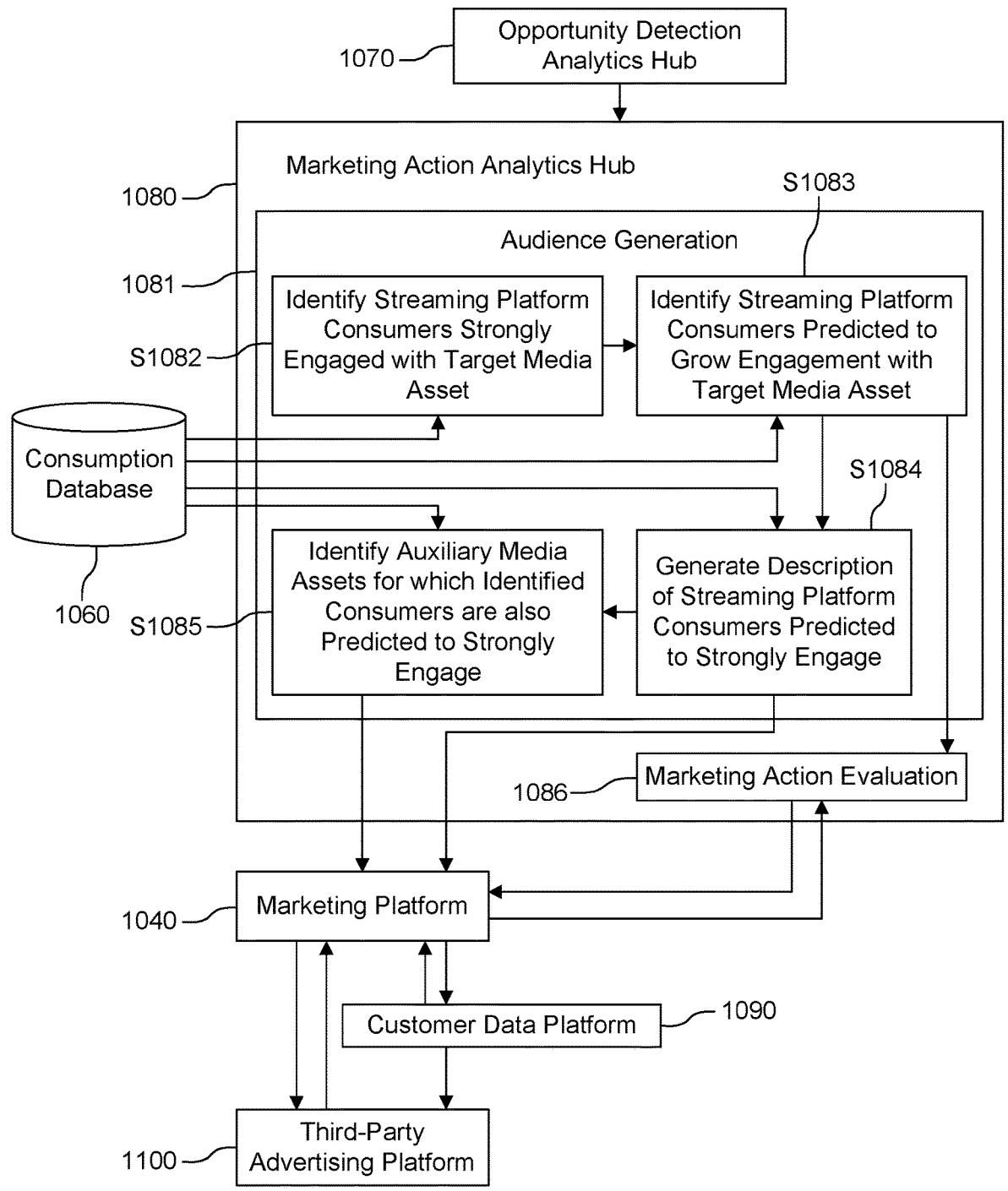
FIG. 4 is a schematic showing additional details of a marketing action analytics hub according to some embodiments of the disclosure.

In more detail, FIG. 4 is a schematic showing additional details of the marketing action analytics hub 1080 according to some embodiments of the disclosure. In a specific embodiment of the process, the marketing action analytics hub 1080 receives a message from the opportunity detection analytics hub 1070, triggering the discovery and delivery of an opportunity specific marketing audience (audience generation 1081).

In step S1082, the marketing action analytics hub 1080 uses engagement metrics extracted from the consumption database 1060 to identify the streaming platform consumers most strongly engaged with the target media asset. In step S1083, based on the engagement features of the streaming platform consumers currently engaged with the target media asset, the marketing action analytics hub 1080 uses a statistical model to predict which streaming platform consumers are most likely to become strongly engaged with the target media asset conditional on additional exposure, potentially through advertising.

Figure 5:
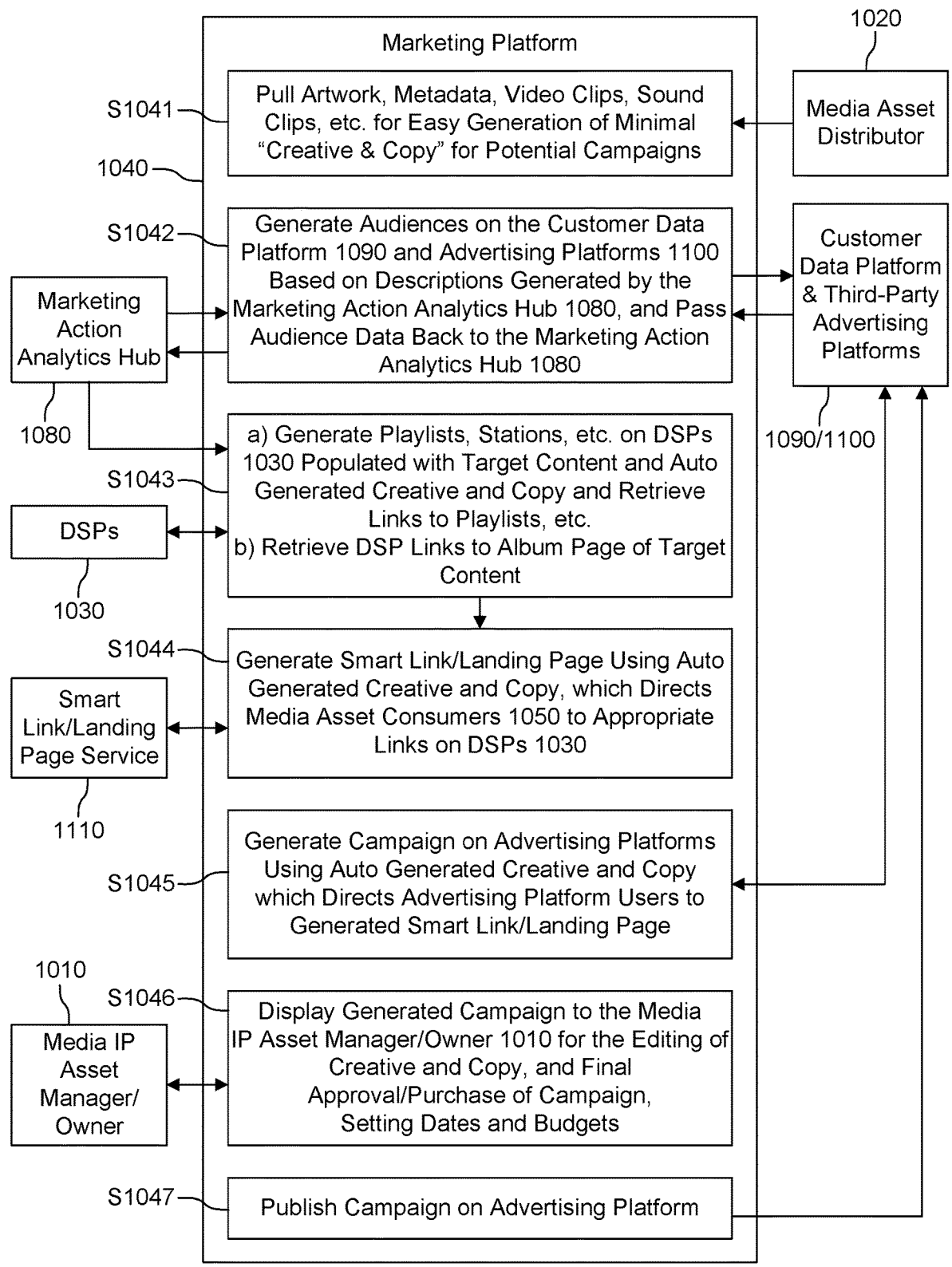
FIG. 5 is a schematic showing additional details of a marketing platform according to some embodiments of the disclosure.

In step S1084, the marketing action analytics hub 1080 generates a high-level description of the media asset consumers identified in step S1083 based on those consumers' artist and genre preferences, and additionally demographic (age, region, gender) information and this description along with the media asset metadata is passed to the marketing platform 1040 (step S1044 in FIG. 5). In step S1085, the marketing action analytics hub 1080 generates a ranked list of additional auxiliary media assets belonging to the artist or label of the target media asset based on the predicted increase in engagement conditional on exposure to those streaming platform consumers identified in step S1083 using the same statistical model utilized in step 1083. This list of additional auxiliary assets is also sent to the marketing platform 1040 for potential automated campaign distribution.

The marketing action analytics hub 1080 receives estimated audience sizes from both the customer data platform 1090 and third-party advertising platforms 1100 via the marketing platform 1040 given the description generated in step S1084, and uses this information along with data from the consumption database 1060 pertaining to previously executed marketing campaigns in a statistical model to predict cost, reach, and extent when marketing to the described audience across each platform (marketing action evaluation 1086). These predictions are combined with the predicted lift in engagement conditional on marketing exposure (step S1083) and used to generate an ROI estimate for the promotion of the target media asset on each advertising platform. Marketing actions evaluated in marketing action evaluation 1086 as having an estimated ROI above a minimum threshold are passed to the marketing platform 1040 for the automated generation of marketing campaigns.

In a specific embodiment of the system and process schematically illustrated in FIG. 4, the marketing action analytics hub 1080 receives a message from the opportunity detection analytics hub 1070, triggering the discovery and delivery of an opportunity specific marketing audience.

For a given media asset, the media asset consumers 1050 on a DSP 1030 are separated into five categories using engagement metrics extracted from the consumption database 1060. The categories include unexposed (consumers that have not streamed the media asset), passive discovery (consumers that have recently streamed the media asset passively, but not actively), active discovery (consumers that have actively streamed the media asset, but only in one recent session), strongly engaged (consumers that have actively streamed the media asset in more than one session recently) and disengaged (consumers that have actively streamed the media asset before, but not recently). Due to the temporal nature of consumer engagement, the categorization of a consumer depends on the time frame considered.

For a given time frame and target media asset, the engagement of all consumers on a DSP is classified into these five categories in step S1082 and a statistical model is then used to predict the engagement of a consumer i with a target media asset j belonging to an engagement category k conditional on additional exposure in step S1083. In general, the statistical model used to predict engagement of a consumer with a target media asset is characterized by the engagement and exposure of all media asset consumers with the entirety of related media assets in the consumption database. The model is trained offline on a regular cadence (e.g. weekly, monthly) including engagement categories as features to describe the temporal nature of consumer engagement so that when a potential opportunity for a target media asset is detected the model identifies the media asset consumers that are strongly engaged or predicted to be strongly engaged with that target media asset as efficiently as possible while still encompassing the full complexity of engagement at the individual media asset consumer engagement level across the entirety of distributed media assets and engagement categories. The model is also characterized by its ability to generate a description of the consumers predicted to be strongly engaged on the DSPs that can be used by customer data platforms and third-party advertising platforms.

In the embodiment described herein, for step S1083, in the statistical model used to predict the engagement of a consumer i with a target media asset j belonging to an engagement category k conditional on additional exposure, engagement is measured as a binary variable $$p_{ij} = \begin{cases} 1 & \text{if } r_{ij} \geq 2 \\ 0 & \text{if } r_{ij} < 2 \end{cases}$$

where $r_{ij}$ is the number of active streaming sessions of a consumer i with a media asset j in a given time frame. The predicted engagement of a consumer i with a target media asset j is modeled as $c_{ij} = 1 + \xi(r_{ij})$, where $\xi$ is positive-definite, non-singular, and monotonically increasing.

Consumer engagements are modeled using a deep neural network with input layers consisting of three sparse, binarized feature vectors ($u_i$, $t_j$, $v_k$) that describe consumer i, media asset j and category k, respectively. These are individually mapped into three separate dense embedding layers which are both fed into a deep, multi-layer neural network architecture which then maps to the predicted engagement $\hat{p}_{ij}$. Since the predicted consumer engagement is a probability, the model is trained by maximizing the posterior distribution with a cross-entropy log-likelihood and Bayesian priors on all model parameters $$\hat{U}, \hat{T}, \hat{V}, \hat{\Theta} = \min_{U,T,V,\Theta} -\sum_{i,j} c_{ij}(p_{ij}\log(\hat{p}_{ij}) + (1-p_{ij})\log(1-\hat{p}_{ij})) + \lambda\left(\sum_i |U_i|^2 + \sum_j |T_j|^2 + \sum_k |V_k|^2 + \sum_n |\Theta_n|^2\right)$$

where the confidence factor $c_{ij}$ ensures that the fitted model parameter values are dominantly determined by consumer engagements with higher confidence and U, T, V, $\theta$, $\lambda$ are the consumer-embedding, media asset-embedding, category embedding, neural network model parameters and regularization hyperparameter respectively.

In step S1084, the marketing action analytics hub 1080 generates a description of the consumers predicted to be strongly engaged with a target media asset m. In a specific embodiment of step S1084, define $$\text{Support}(A_h) = \frac{\sum_i A_{hi}}{\sum_{h,i} A_{hi}}, \text{Support}(m \cap A_h) \frac{\sum_i A_{hi} * m_i}{\sum_{h,i} A_{hi}}$$

and $$\text{Confidence}(A_h \to m) = \frac{\sum_i A_{hi} * m_i}{\sum_i A_{hi}},$$

where $A_{hi}$ is an indicator taking a value of one when consumer i is strongly engaged with an artist h and a value of zero otherwise, and $m_i$ is similarly an indicator taking a value of one when consumer i is strongly engaged or predicted to strongly engage with the target media asset m and a value of zero otherwise, and $i \in 1$ is the set of all engaged consumers and $h \in H$ is the set of all distributed artists during the given analysis time frame. The marketing action analytics hub 1080 identifies a list of all artists such that $\text{Support}(A_h) > \text{minsupp}_{A_h}$, $\text{Support}(m \cap A_h) > \text{minsupp}_{m,A_h}$, and $\text{maxconf}_{m,A_h} > \text{Confidence}(A_h \leftarrow m) > \text{minconf}_{m,A_h}$ (where thresholds are algorithmically selected for the target media asset). From this list the marketing action analytics hub 1080 determines a subset H' of all available artist interests H that jointly maximizes the size and expected engagement of the audience D described by H'. More specifically $D := \{i | i \in \cup_{h \in H'} \text{Aud}_h\}$ where $\text{Aud}_h$ is the set of all consumers strongly engaged with artist h, and the expected engagement of this audience is $$\frac{\sum_{i \in D} \hat{p}_{im}}{|D|}$$

where $\hat{p}_{im}$, is the predicted engagement of consumer i with the target media asset m as computed using the model in S1083.

To further assess the strength of the predictive relationship between the engagement behaviors of the consumers in D who have been exposed to the target media asset $E_e$ and the engagement behaviors of the as yet unexposed consumers $E_u$, the marketing action analytics hub 1080 computes their correlation $\text{Corr}(E_e, E_u)$. The audience is further refined by demographic features (age, region, gender) which generates a high-level description of the consumers to pass to the marketing platform 1040 (step S1042 in FIG. 5).

In step S1085, using the same statistical model as in step S1083, the marketing action analytics hub 1080 generates a ranked list of additional auxiliary media assets belonging to the artist or label of the target media asset for which there is a sufficiently large predicted increase in engagement of the consumers described in step S1084. This list of auxiliary assets together with the original target media asset, m, is denoted M' and is also sent to the marketing platform 1040 for potential automated campaign distribution.

In the marketing action evaluation 1086, after receiving estimated audience sizes from both the customer data platform 1090 and third-party advertising platforms 1100 via the marketing platform 1040 given the description generated in step S1084, the marketing action analytics hub 1080 derives an ROI estimate for the marketing action and target media asset and auxiliary assets from a model trained on historical campaign data:

$$\frac{\left(\frac{\hat{N}_I}{|D|}\right) * \left(\sum_{i \in D, j \in M'} \hat{p}_{ij}\right) - C}{C},$$

where C is the campaign cost and $\hat{N}_I$ is the predicted number of consumers acquired and is a function of potential reach, campaign budget, and territory.

The marketing action analytics hub 1080 passes marketing actions for the target media asset classified as having an estimated ROI above a minimum threshold in the marketing action evaluation 1086 along to the marketing platform 1040 for the automated generation of marketing campaigns.

Marketing Platform 1040

Briefly, according to one aspect described herein, the marketing platform 1040 is configured to interact with the marketing action analytics hub 1080 and create marketing campaigns based around high growth potential audiences and suggest marketing actions to media IP asset managers and owners 1010 to advertise to audiences predicted to be strongly engaged with their media assets on appropriate marketing channels via targeted marketing campaigns, including receiving the ranked list of media assets and corresponding recommended marketing actions and their advertising platform descriptions of audiences for the media assets in the ranked list as well as a ranked list of auxiliary media assets from the marketing action analytics hub 1080.

In more detail, FIG. 5 is a schematic showing additional details of the marketing platform 1040 according to some embodiments of the disclosure. In a specific embodiment of the process, the receipt of vetted opportunities for a target media asset, coupled with media asset specific target audiences on each available advertising channel (e.g., direct via a customer data platform 1090 or through a third-party advertising platform 1100) from the marketing action analytics hub 1080, initiates the automatic generation of marketing campaigns for the potential purchase and execution by the target media IP asset managers/owners 1010.

In step S1041, in preparation for the potential generation of marketing campaigns, the media asset distributor 1020 sends promotional advertisement material, e.g. album art, sample sound/video clips, etc. to the marketing platform 1040 along with the media IP assets by the target media IP asset managers/owners 1010. In step S1042, when the marketing platform 1040 receives an audience description from the marketing action analytics hub 1080 (step S1084 in FIG. 4), the marketing platform 1040 interfaces with the customer data platform 1090 and the associated third-party advertising platform 1100 via an API to retrieve details of the audience reachable on those platforms (the customer data platform 1090 and the associated third-party advertising platform 1100) determined by the given description. The marketing platform 1040 then passes details of the audience back to the marketing action analytics hub 1080 (marketing action evaluation 1086) for a final vetting of the opportunity (including the target media asset, coupled with the specific audience available on a given platform optimized for the particular media asset).

In step S1043, conditional on the receipt of a vetted opportunity from the marketing action analytics hub 1080, the marketing platform 1040 then interfaces with a DSP 1030 via an API to generate a playlist, station, etc. on the DSP 1030 featuring the target media asset along with additional auxiliary assets identified in the marketing action analytics hub 1080 (step S1085). The marketing platform 1040 also interfaces with a DSP 1030 via an API to retrieve links to appropriate album or artist landing pages within the DSP client when the generation of playlists, stations, etc. is not a viable option for the particular DSP 1030.

In step S1044, the marketing platform 1040 interacts with a smart link and landing page service provider 1110 via an API to generate a landing page for the target media asset. This landing page directs media asset consumers 1050 to engage with the target media asset and auxiliary assets on the DSPs 1030 via the links retrieved in step S1043. In step S1045, the marketing platform 1040 interacts with the customer data platform 1090 and the third-party advertising platform 1100 via an API to generate campaigns on those platforms with vetted high ROI audiences (marketing action evaluation 1086 in FIG. 4).

In step S1046, the marketing platform 1040 displays all generated campaigns to the manager/owner of the target media IP asset 1010 ranked in order of expected ROI, in a GUI which enables the manager/owner to inspect, edit, and set budgets and time frames and to make payments for the campaigns. In step S1047, conditional on authorization and payment by the media IP asset manager/owner 1010, the marketing platform 1040 interacts with the customer data platform 1090 and/or third-party advertising platforms 1100 via an API to publish the authorized campaign.

Campaign Attribution Analytics Hub 1120

Briefly, according to one aspect described herein, the campaign attribution analytics hub 1120 is configured to use data from the consumption database 1060, the marketing platform 1040, the customer data platform 1090, and third-party advertising platforms 1100 to accurately attribute the effect of a marketing campaign, including collecting new campaign specific trend data after a marketing campaign has been launched from the consumption database 1060 as soon as it is processed and made available for analysis.

Figure 6:
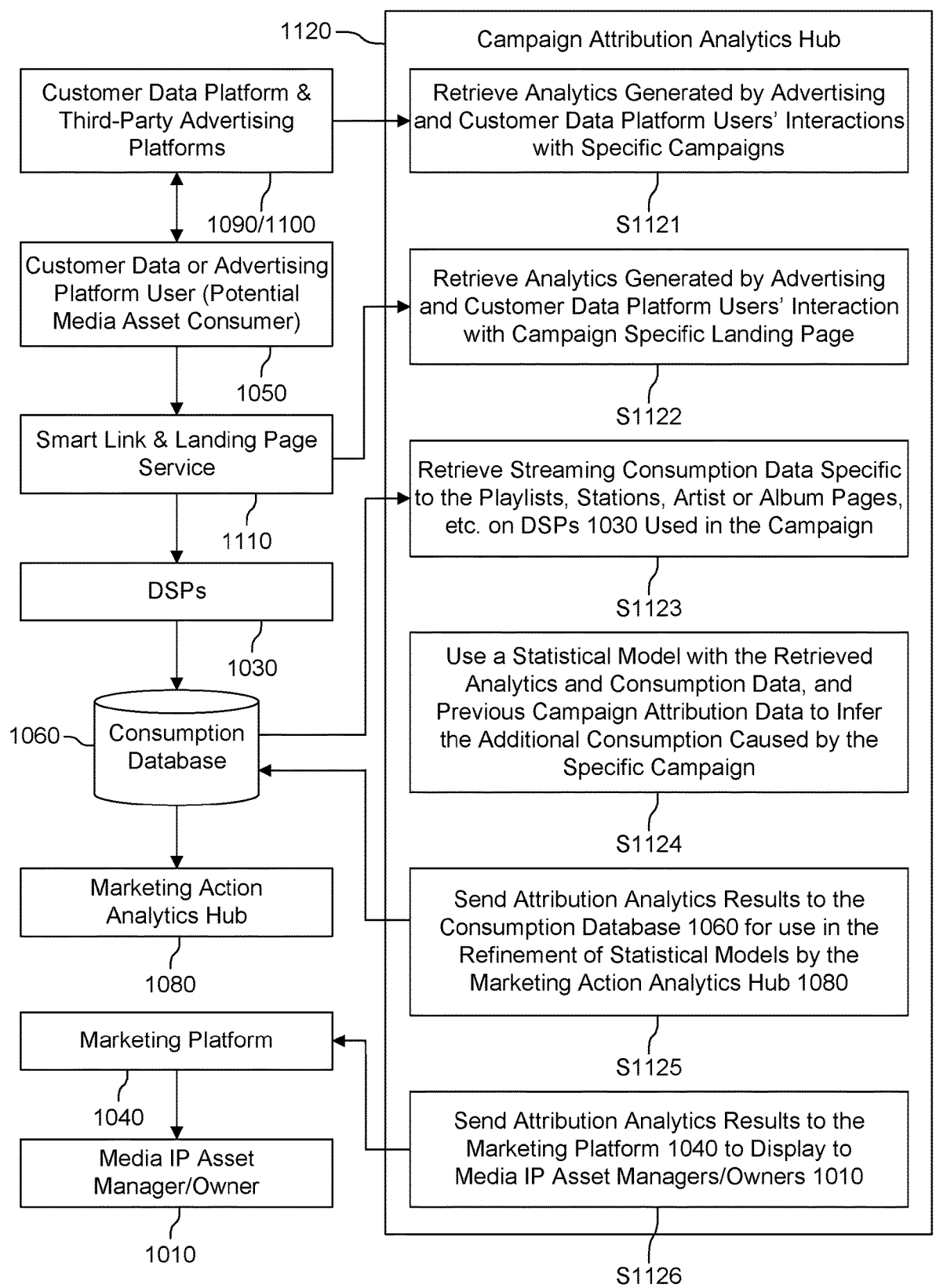
FIG. 6 is a schematic showing additional details of a campaign attribution analytics hub according to some embodiments of the disclosure.

In more detail, FIG. 6 is a schematic showing additional details of the campaign attribution analytics hub 1120 according to some embodiments of the disclosure. In a specific embodiment of the process, analytics data is pulled from a variety of sources to attribute the increase in streaming consumption caused by running the generated campaign authorized by the media IP asset manager/owner 1010 in step S1046 in FIG. 5, and published in step S1047 in FIG. 5.

In step S1121, the analytics generated by customers in the customer data platform 1090 and/or users of third-party advertising platforms 1100 interacting with the campaign are pulled from these platforms to the campaign attribution analytics hub 1120. In step S1122, the analytics generated by interactions with the landing page(s) generated specifically for the campaign (step 1044 in FIG. 5) are pulled to the campaign attribution analytics hub 1120. In step S1123, the consumption data relevant to the campaign, i.e., the data corresponding with the consumption on the DSPs related to the links retrieved and generated in step S1043 of FIG. 5, is retrieved from the consumption database 1060.

In step S1124, the campaign attribution analytics hub 1120 uses a statistical model in conjunction with the data retrieved in steps S1121-S1123 to infer the increases in streaming consumption directly caused by the campaign. In step S1125, the campaign attribution analytics hub 1120 sends the results of the attribution analysis to the consumption database 1060 for storage and later use in the refinement of models which are then used by the marketing action analytics hub 1080.

In step S1126, the campaign attribution analytics hub 1120 sends the results of the attribution analysis to the marketing platform 1040 for display to the media IP asset managers/owners 1010.

In a specific embodiment of the system and process schematically illustrated in FIG. 6, analytics data is pulled from a customer data platform 1090 and third-party advertising platforms 1100 and combined with the relevant campaign consumption data from the consumption database 1060 in the campaign attribution analytics hub 1120 (steps S1121-S1123).

In step S1124 a forecast model is trained to predict the background discovery and re-engagement rates within the streaming context of the media asset links on the DSPs (e.g., playlist or album page) associated with the marketing campaign. The model is trained to utilize cross correlations between the streaming context of the associated media asset link and other engagement contexts both within the same DSP as well as on other DSPs to control for exogenous increases in streaming which are not directly caused by marketing efforts. Let $D_t$ and $R_t$ denote the multivariate discovery and re-engagement event time series of the target content corresponding with the associated media asset links respectively; let $C_t$ denote the multivariate time series of ad-campaign click events directing media asset consumers 1050 to the target content via the associated media asset links; and let $A_t$ denote the multivariate auxiliary time series of discovery and re-engagement events occurring within all other streaming contexts and on all other DSPs excepting those which media asset consumers 1050 are directed to via the associated media asset links. Then a prediction model $$\hat{D}_{t:t+p}, \hat{R}_{t:t+p} \sim N(\mu, \sigma) \sim f(D_{t-q:t-1}, R_{t-q:t-1}, A_{t-q:t+p}, C_{t-q:t+p})$$

is fit using the historical consumption features described above, where p is the campaign duration, q delineates the lagged features used as inputs to the model and the model f is operationalized as a gated convolutional neural network, trained by minimizing approximate cross entropy loss. This allows for the robust inference of the causal impacts of the ad-campaign discovery and re-engagement with the target content.

EXAMPLES

The following describes example usage scenarios for the system and process disclosed herein. The present disclosure may be used by companies whose customers are IP holders, that is for example, people who own and manage the rights to sound recordings. Rights are monetized by distributing recordings, either directly or through a distributor to DSPs, and in particular, to audio and video streaming services, e.g. Spotify, Apple Music, YouTube, etc. DSPs typically pay sound recording rights holders based on their IP's share of all streams on platform within a territorial (typically national) market over a given subscription type and billing period (typically monthly). This is in contrast to other existing models such as the Netflix model and the retail purchase or rental model, and to how DSPs "charge" consumers. In the Netflix model, content is licensed by a DSP from rights holders for a fixed upfront fee for a given period in a given set of territories, independent of how much DSP subscribers do or do not stream that content subsequently. In the retail purchase or rental model (e.g., iTunes or brick and mortar stores), retailers pay a percentage of the one-time transaction price paid by the consumer onto the rights holder. DSPs typically "charge" consumers typically through recurring subscription fees (and/or in some cases one-time fees or the opportunity to show advertisements). In exchange, consumers are provided unlimited access to large libraries of media assets that have been distributed to the DSPs by rights holders through a media asset distributor.

This monetization arrangement, which provides consumers with unlimited access for a fixed cost and hence zero marginal cost to additional streaming and where rights holders are effectively paid on a per stream basis, together with the recent dominance of streaming as the primary mode of paid music consumption, means that recurring streaming events, not one-time purchases, are the primary monetizable events for media IP asset owners. Subscription and ad-supported streaming accounted for 47% of global recorded music industry revenue, compared to the 37% driven by digital and physical retail sales, in 2018 according to the IFPI.

Under the streaming monetization model, a rights holder's entire catalog of media assets, not just recent releases drive revenue through recurrent streaming. How media IP asset managers and owners should best allocate promotional resources across the entirety of their catalog with the aim of increasing sustained audience engagement and hence driving recurrent streaming and revenue, is a problem that the present disclosure is provided to address.

In the example usage scenario, a media IP asset manager 1010 and customer of a distribution service has distributed ~1 k sound recordings through the digital media asset distributor 1020 (step S01 in FIG. 2) over several years as a customer of this distributor. Steps S2-S20 in FIG. 2 occur automatically "behind the scenes", from the perspective of the media IP asset manager 1010, scanning each of these ~1 k media assets daily for statistical indications of potential marketing opportunities.

When one or more opportunities are detected for any of these 1 k media assets managed by the media IP asset manager 1010, the media IP asset manager 1010 receives an automatically generated email which alerts them to the fact that new marketing opportunities have been detected. The email provides a link which will log them into a GUI, specifically the marketing platform 1040. This GUI serves as the interface for the media IP asset manager 1010 with the services provided by the opportunity detection analytics hub 1070, the marketing action analytics hub 1080, and the campaign attribution analytics hub 1120.

Upon logging into this marketing platform 1040, the media IP asset manager 1010 is presented with a list of the media assets under their management with marketing opportunities ranked by anticipated ROI given specific marketing actions.

FIG. 7 shows an example GUI for a list of media assets ranked by anticipated ROI that may be presented to the media IP asset manager 1010. As shown in FIG. 7, opportunities are ranked in order of anticipated ROI, and for each opportunity, the media asset and recommended marketing action are listed. The GUI enables the media IP asset manager 1010 to review the marketing action (step S22 in FIG. 2). For example, when the media IP asset manager 1010 clicks on a specific marketing action, the GUI may take the media IP asset manager 1010 to a new page where the recommended action(s) can be previewed.

Figure 8:
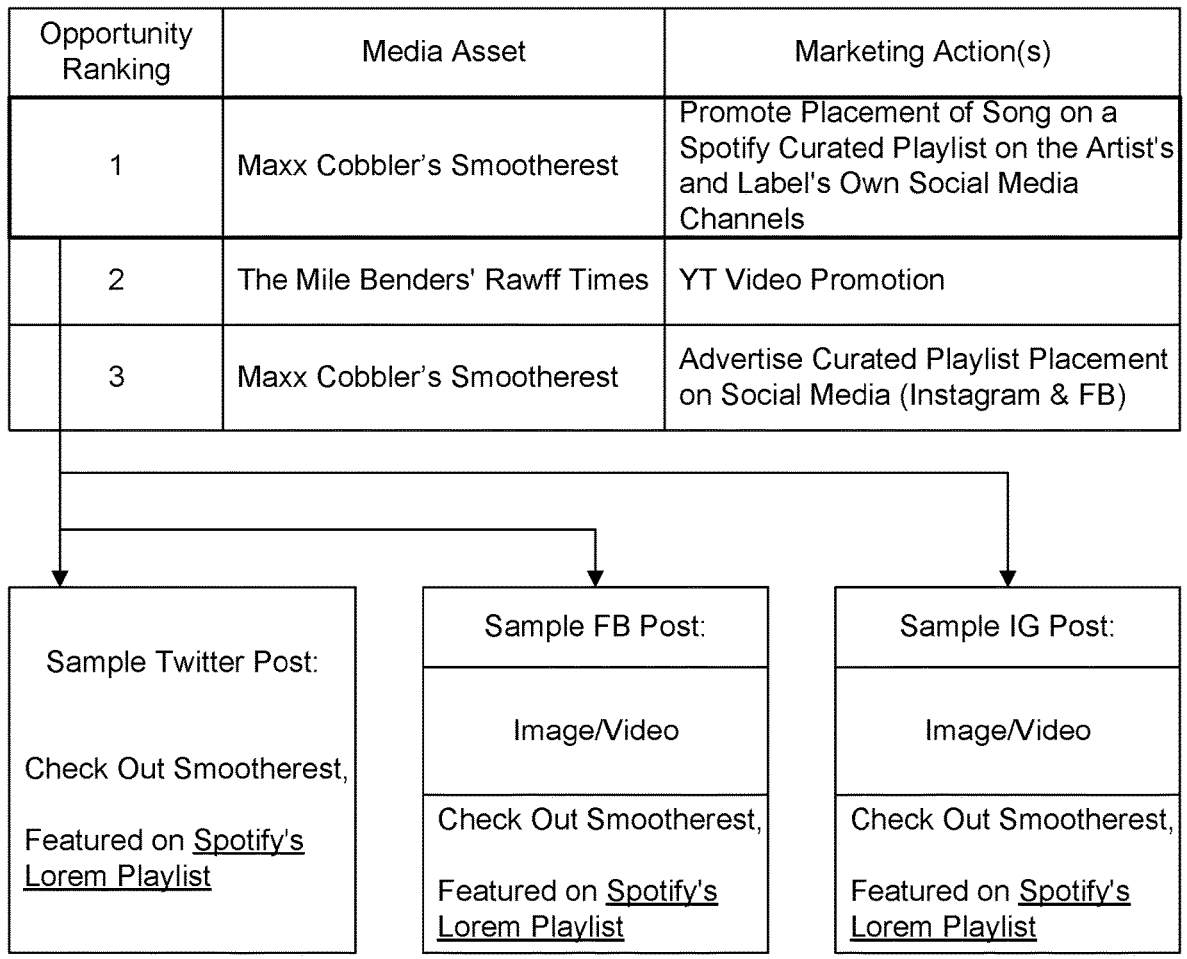
FIG. 8 shows an example page that includes previews of recommended actions according to some embodiments of the disclosure.

More specifically, FIG. 8 shows an example GUI displayed to the media IP asset manager 1010 in response to selecting a specific marketing action, such as marketing action 1. As shown in FIG. 8, the GUI displays samples and/or previews of recommended actions, thereby allowing the media IP asset manager 1010 to visually evaluate recommended actions. In particular, in the example GUI of FIG. 8, the GUI displays samples of Twitter, Facebook and Instagram posts, each of which might include images and/or video, and each of which might include a sample call to action.

The text and images for these campaigns are generated automatically using the image/video assets uploaded at the time of distribution (step S01 in FIG. 2) and thereafter associated with the media asset. The GUI also enables the media IP asset manager 1010 to upload new image/video assets and use them in the marketing action, and to modify the default text for the marketing action (steps S22 and S23 in FIG. 2).

The media IP asset manager 1010 has the ability to set a budget authorizing the marketing platform 1040 to purchase advertising on behalf of the media IP asset manager 1010 (step S23 in FIG. 2), as well as set dates for when the marketing action will run.

More specifically, FIG. 9 shows an example GUI that enables the media IP asset manager 1010 to set a budget and dates for the marketing action. Budget and dates are settable for each different sample/preview of a marketing action. In addition, the GUI provides the opportunity to select "Execute", so as to execute the selected marketing action according to the set budget and timetables. Accordingly, when the media IP asset manager 1010 is satisfied with the campaign dates, budget, creative and copy, they have the option to execute the campaign (step S23 in FIG. 2).

Once the media IP asset manager 1010 authorizes and executes the marketing actions (step S23 in FIG. 2), steps S24-S32 in FIG. 2 occur "behind the scenes" from the perspective of the media IP asset manager 1010. The marketing materials are pushed out to the appropriate platforms and the analytics and attribution for these marketing actions are conducted primarily by the campaign attribution analytics hub 1120.

Periodically throughout the duration of the marketing action and after (e.g., weekly), an alert (e.g., email, push notification) is sent to the media IP asset manager 1010 notifying them that new results from their campaign are available. The alert provides a link which enables them to access the marketing platform 1040, and view the campaign analytics page, which gives a summary of each marketing action's effectiveness to date (step S33 in FIG. 2). FIG. 10 shows an example GUI for a campaign analytics page.

More specifically, FIG. 10 shows a GUI for analytics for a particular marketing action, and provides analytics for the marketing action in the form of consumers acquired and streams driven by the marketing action. In the example GUI shown in FIG. 10, these are broken out by date to provide visibility into the trend over time of the effectiveness of the selected marketing action. Thus, the campaign analytics page gives a summary of each marketing action's effectiveness to date (step S33 in FIG. 2).

Architecture

Figure 11:
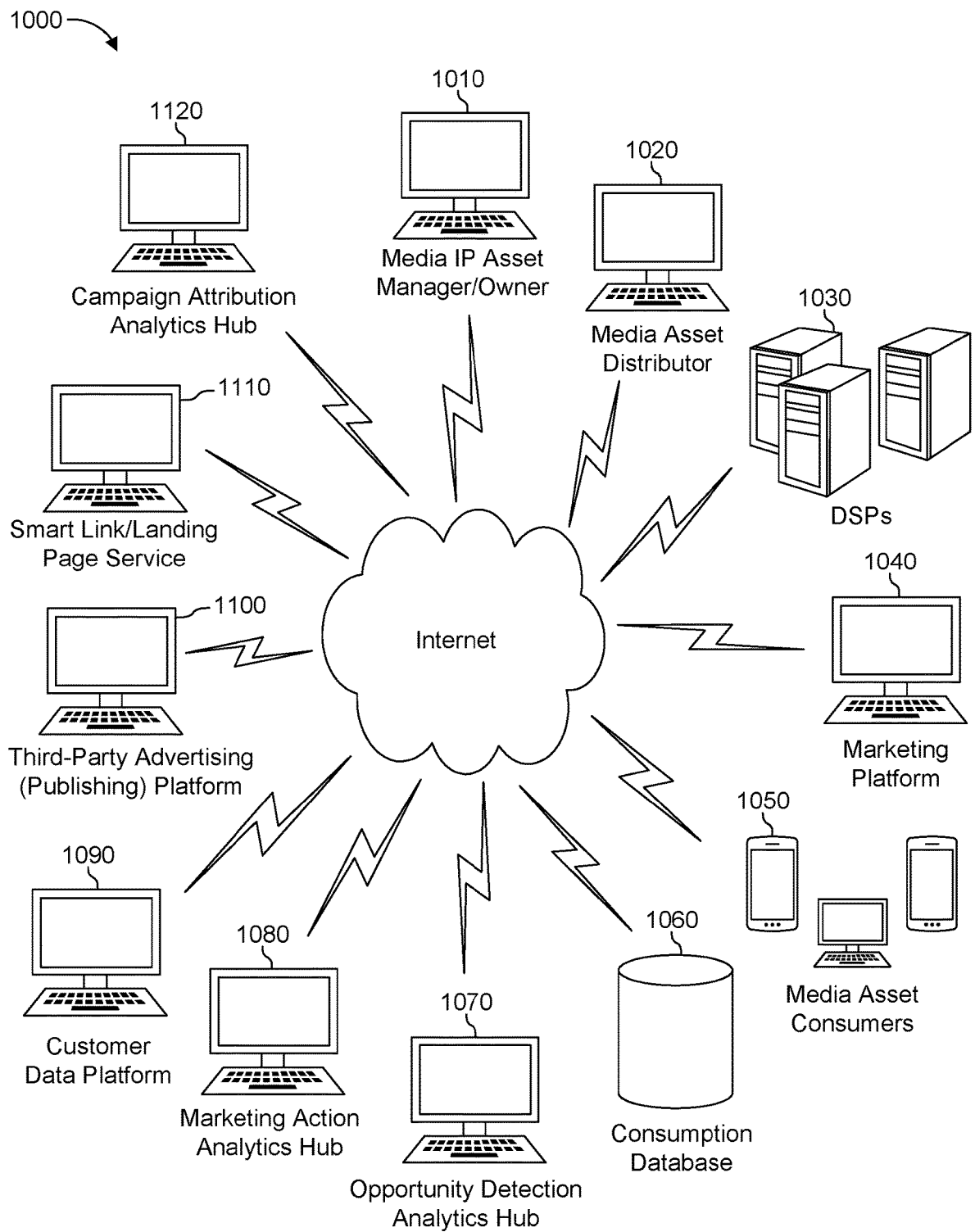
FIG. 11 is a schematic showing example architecture of the marketing analytics pipeline according to some embodiments of the disclosure.

FIG. 11 is a schematic showing example architecture of the marketing analytics pipeline 1000 according to some embodiments of the disclosure. The marketing analytics pipeline 1000 can be implemented by a plurality of computing devices. The computing devices may include, for example, personal computers, network computers, game consoles, work stations, application servers, databases, and personal communication devices. The computing devices may communicate with each other via the internet. The computing devices may be dedicated "hard-wired" devices, or programmable devices. Each of the computing devices shown in FIG. 11 may be an integrated unit or may be implemented using a plurality of distributed computing devices.

Each of the computing devices may include one or more processors, computer-readable memory media, and a memory. The processors may operate to execution instructions stored in the memory. The computer-readable memory media, for example, hard disk drives, store computer-executable instructions that implement the methods described above. The computing devices may include input and output devices, such as a keyboard, a mouse, and a monitor, for example. Each computing device may include a network interface that enables the computing device to connect to the internet, and communicate with other computing devices in the marketing analytics pipeline 1000.

The embodiments illustrated and discussed in this specification are intended only to teach those skilled in the art how to make and use the disclosure herein. In describing embodiments of the disclosure herein, specific terminology is employed for the sake of clarity. However, the disclosure herein is not intended to be limited to the specific terminology so selected. The above-described embodiments of the disclosure herein may be modified or varied, without departing from the disclosure herein, as appreciated by those skilled in the art in light of the above teachings. It is therefore to be understood that, within the scope of the claims and their equivalents, the disclosure herein may be practiced otherwise than as specifically described.

The invention claimed is:

1. A marketing analytics pipeline that receives transaction-level trend reporting of streaming media intellectual property (IP) assets distributed on digital service providers (DSPs), comprising:
    an opportunity detection analytics hub configured to monitor consumption profiles of said streaming media IP assets and automatically detect growth and re-engagement opportunities as they occur;
    a marketing action analytics hub configured to receive the growth and re-engagement opportunities from the opportunity detection analytics hub and to identify high growth potential audiences using predictive models of engagement;
    a marketing platform configured to interact with the marketing action analytics hub and to create marketing campaigns based around the high growth potential audiences and suggest marketing actions to media IP asset managers and owners to deliver to the high growth potential audiences on appropriate marketing channels via targeted marketing campaigns; and
    a campaign attribution analytics hub configured to use data from a consumption database, the marketing platform, a customer data platform, and third-party advertising platforms to accurately attribute the effect of the marketing campaigns,
    wherein in monitoring consumption profiles of streaming media IP assets and automatically detecting growth and re-engagement opportunities as they occur, the opportunity detection analytics hub is configured to use transaction-level trend data reports from a consumption database to fit statistical models based on consumption patterns of an entirety of distributed media IP assets on a regular cadence,
    wherein the opportunity detection analytics hub is configured to automatically detect statistically significant changes by:
    modeling stream counts y as noisy measurements of a latent multivariate state vector z consisting of level l, trend b, and periodic offset components $s_t$ which model day of week variances in stream counts at time t, wherein the latent multivariate state propagates forward in time via a linear Markov process, defined by $z_t = A_t z_{t-1} + \varepsilon_t \epsilon_t$, while its connection to new data is modeled as $y_t = B_t z_t + \eta_t$;
    wherein t and t−1 refer to current and prior states, respectively, $A_t$ is a state transition matrix that propagates vector z forward in time from t−1 to t, $B_t$ is a matrix that connects new data y to vector z at time t, $\varepsilon_t$ is a vector of scaling parameters at time t, and $\epsilon_t$ and $\eta_t$ are univariate Gaussian noise terms at time t;
    employing a dynamic Bayesian network to propagate the full posterior distribution of the state forward in time, which recursively updates the state distribution with each new data point as $p(z_t|y_{0:t}) \propto p(y_t|z_t) \int p(z_t|z_{t-1}) p(z_{t-1}|y_{0:t-1}) dz_{t-1}$;

wherein each p( ) represents a probability function of an event occurring,
    predicting future state distributions at a future time T in the absence of new data by computing $p(z_{t+T}|y_{0:t}) = \int p(z_{t+T}|z_{t+T-1}) p(z_{t+T-1}|z_{t+T-2}) \ldots p(z_t|y_{0:t}) dz_{t+T-1} dz_{t+T-2} \ldots dz_t$ wherein rapid significant changes in consumption are detected by recursively calculating the probability that the current state distribution is equivalent to the predicted one based on previous data, and
    wherein explicitly modeling the posterior distribution of the trend b enables the detection of gradual significant changes by recursively calculating the probability that b significantly deviates from zero.

2. The marketing analytics pipeline according to claim 1, wherein the opportunity detection analytics hub is further configured to use statistical models to analyze growth and re-engagement potential for the distributed media IP assets exhibiting or predicted to exhibit significant changes in their consumption patterns and to classify them as potential marketing opportunities or non-opportunities.

3. A marketing analytics pipeline that receives transaction-level trend reporting of streaming media intellectual property (IP) assets distributed on digital service providers (DSPs), comprising:
    an opportunity detection analytics hub configured to monitor consumption profiles of said streaming media IP assets and automatically detect growth and re-engagement opportunities as they occur;
    a marketing action analytics hub configured to receive the growth and re-engagement opportunities from the opportunity detection analytics hub and to identify high growth potential audiences using predictive models of engagement;
    a marketing platform configured to interact with the marketing action analytics hub and to create marketing campaigns based around the high growth potential audiences and suggest marketing actions to media IP asset managers and owners to deliver to the high growth potential audiences on appropriate marketing channels via targeted marketing campaigns; and a campaign attribution analytics hub configured to use data from a consumption database, the marketing platform, a customer data platform, and third-party advertising platforms to accurately attribute the effect of the marketing campaigns, wherein the marketing action analytics hub identifies high growth potential audiences using predictive models of engagement by steps comprising:

automatically receiving media assets classified as potential marketing opportunities from the opportunity detection analytics hub, identifying a set D of consumers expected to have strong engagement with a target media asset m;

predicting a number of consumers $\hat{N}_I$ acquired by a marketing campaign, wherein $N_I$ is a function of potential reach, campaign budget and territory;

wherein the marketing action analytics hub is further configured to use transaction-level trend data reports and metadata as well as past marketing campaign results in a consumption database to fit statistical models in an offline setting on a regular cadence based on the consumption behavior of all media asset consumers to predict a frequency of engagement of said consumers with an entirety of distributed media IP assets should said consumers become exposed by marketing actions, and is further configured to estimate a cost per customer acquired and to estimate a rate of return on customers acquired by a campaign targeted to customers classified as highly likely to increase their frequency of engagement with the target media asset and auxiliary assets, wherein the rate of return is estimated using a model trained on historical campaign data:

$$\frac{\left(\frac{\hat{N}_I}{|D|}\right) * \left(\sum_{i \in D, j \in M'} \hat{p}_{ij}\right) - C}{C}$$

wherein C is cost of the campaign and M' is the set of auxiliary assets which includes the original target media asset m, wherein |D| is cardinality of the set D of consumers expected to have strong engagement with the target media asset m, wherein $\hat{p}_{ij}$ is the predicted engagement of consumer i with the target media asset j, and wherein $\Sigma_{i \in D, j \in M'} \hat{p}_{ij}$ signifies the sum of all $\hat{p}_{ij}$ over all elements i of the set D of consumers and also over all elements j in the set M' of auxiliary assets.

* * * * *